United States Patent
Kajan et al.

(10) Patent No.: US 7,365,622 B2
(45) Date of Patent: Apr. 29, 2008

(54) SWITCHING DEVICE COMBINATION FOR CAPACITIVE LOADS CONNECTED TO DIRECT VOLTAGE

(75) Inventors: Risto Kajan, Vaasa (FI); Erkki Rajala, Vaasa (FI); Mikael Nåhls, Raippaluoto (FI); Simo Pöyhönen, Vantaa (FI); Martti Varpela, Vantaa (FI); Markku Talja, Järvenpää (FI)

(73) Assignee: ABB OY, Helsinki (FI)

( * ) Notice: Subject to any disclaimer, the term of this patent is extended or adjusted under 35 U.S.C. 154(b) by 135 days.

(21) Appl. No.: 10/578,332

(22) PCT Filed: Nov. 3, 2004

(86) PCT No.: PCT/FI2004/000651

§ 371 (c)(1),
(2), (4) Date: May 4, 2006

(87) PCT Pub. No.: WO2005/045864

PCT Pub. Date: May 19, 2005

(65) Prior Publication Data

US 2007/0035909 A1    Feb. 15, 2007

(30) Foreign Application Priority Data

Nov. 5, 2003   (FI) ................................ 20031604

(51) Int. Cl.
*H01H 43/00*   (2006.01)

(52) U.S. Cl. .......................................... 335/59; 335/64

(58) Field of Classification Search ............ 335/59–67; 318/801–803
See application file for complete search history.

(56) References Cited

U.S. PATENT DOCUMENTS 6,452,469 B1 * 9/2002 Isaksson et al. ............. 335/157

FOREIGN PATENT DOCUMENTS

| EP | 1 039 611 A2 | 9/2000 |
|----|--------------|--------|
| EP | 1 202 305 A2 | 5/2002 |

* cited by examiner

*Primary Examiner*—Ramon M. Barrera
(74) *Attorney, Agent, or Firm*—Birch, Stewart, Kolasch & Birch, LLP

(57) ABSTRACT

This publication discloses a switching device combination for capacitive loads (3) connected to a direct voltage. The switching device combination includes an actual switch component (1) for connecting voltage to the capacitive load (3), a charging switch component (2) for connecting charging voltage to the capacitive load in the initial stage, which charging switch component is dimensioned for a lower current than the actual switch component (1), a controller component (4), by means of which the actual switch component (1) is controlled from an open state to a closed state and vice versa, with the aid of a mechanical lever (5), which is connected to a first shaft (6), and delay elements (11) for delaying the connection of the actual switch component (1), so that the closed charging switch component (2) will have time to charge the capacitive load (3) before the connection of the actual switch component (1). According to the invention, the controller component (4) includes a second shaft (7), which is operationally connected to the first shaft, in order to control the charging switch component (2).

8 Claims, 4 Drawing Sheets

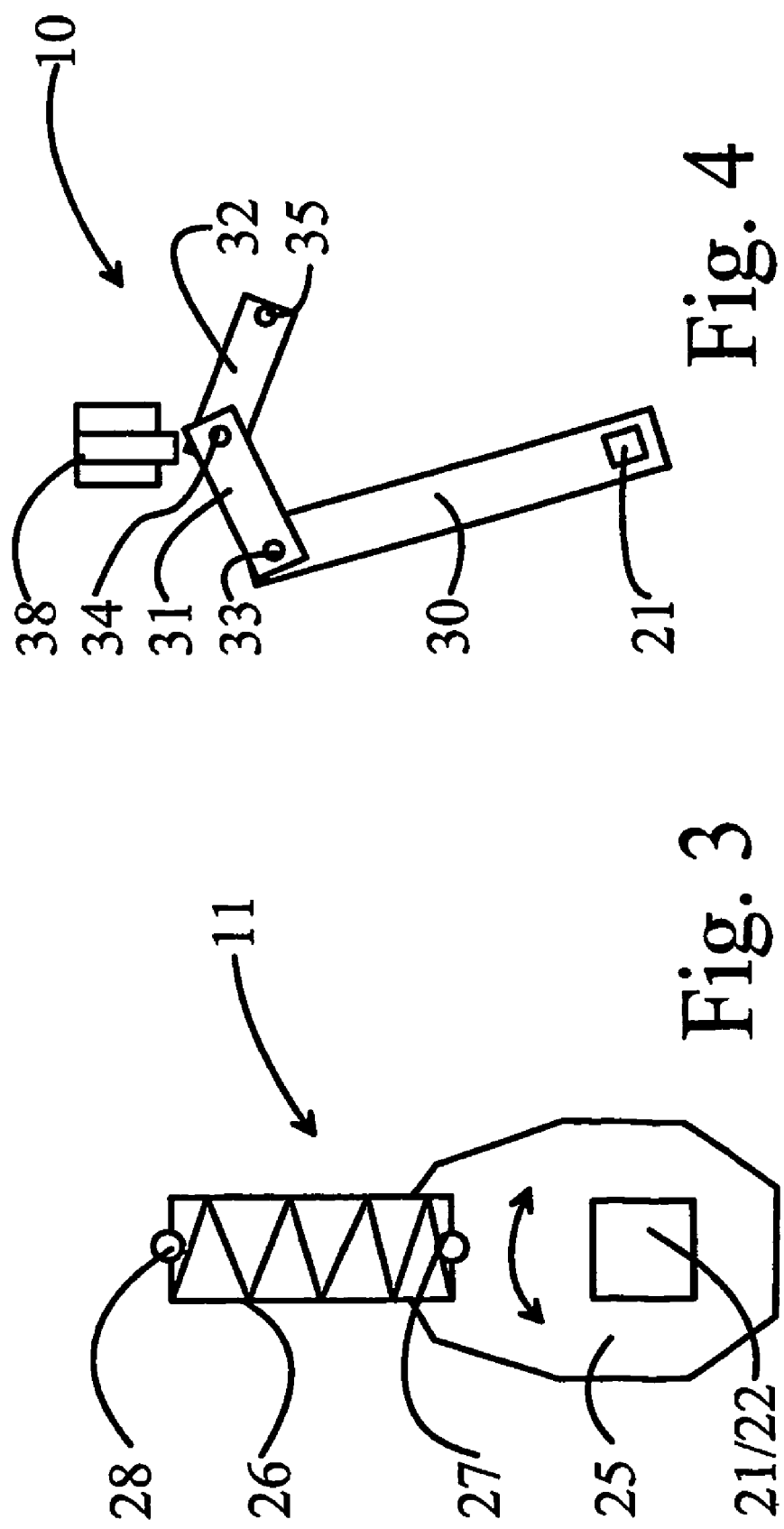

SWITCHING DEVICE COMBINATION FOR CAPACITIVE LOADS CONNECTED TO DIRECT VOLTAGE

The present invention relates to a switching device combination, according to the preamble of claim 1, for capacitive loads connected to direct voltage.

Devices of this kind are used, for example, in connection with the inverter control devices of electric motors.

Similar devices according to the prior art are implemented in such a way that the mechanical lever that acts as a control has only two positions, open and closed. Such a solution is implemented in, for instance, FI patent 109 558. When the switch is closed, one of the two contacts (−) of the main circuit and the contact of the charging circuit close, but the other of the main circuit's contacts (+) remains held in the open position, set ready to be released to the closed position by a coil, when the voltage of the capacitor rises sufficiently.

Associated with the three-contact basic solution is the problem that the fuse of the second (−) terminal is dimensioned according to the rated current of the drive (e.g., 1000 A), but, at the moment of charging, there is a small fuse (at the most some tens of amperes) only for the (+) terminal. In addition, at large rated nominal currents, for example, 630 A, the charging-circuit contact is unnecessarily sturdily dimensioned, thus increasing costs and taking up unnecessary space in the switchgear.

In the solution in question, four contacts could be used, which would give both terminals of the charging circuit small fuses, but would further increase the unnecessary costs and space requirement, as the charging circuit will have two contact elements dimensioned for a large rated current.

The invention is intended to eliminate the defects of the state of the art described above and for this purpose create an entirely new type of switching device combination for capacitive loads connected to a direct voltage.

The invention is based on controlling the main switch component and the charging switch component using separate shafts for them, the operational connection of which to each other includes a gap.

According to one preferred embodiment of the invention, the charging-circuit shaft and the switch shaft are aligned at essentially right angles to each other.

More specifically, the switching device combination according to the invention is characterized by what is stated in the characterizing portion of claim 1.

Considerable advantages are gained with the aid of the invention.

With the aid of the invention, the main switch component and the charging switch component can be separated mechanically from each other and thus use solutions that are more economical in both dimensions and cost. Particularly, the charging switch component can be implemented considerably more economically than when using the prior art. The fuses of both terminals of the charging circuit, which have a smaller rated current, give the device greater protection than the prior art in fault situations, for example, in the case of earth leakage from the negative terminal. Because a switch-fuse is used in the charging circuit, the fuse can be changed in a de-energized state. If the power of the main switch component needs to be increased, according to the invention no changes will be needed in the charging switch component. When using one preferred shaft arrangement of the switching device arrangement, up to three parallel loads can be connected to the same device casing, without having to increase the size of the casing.

In the following, the invention is examined with the aid of examples and with reference to the accompanying drawings.

FIG. 3 shows the spring element applied to the invention.

FIG. 4 shows the delay element applied to the invention.

Figure 1A:
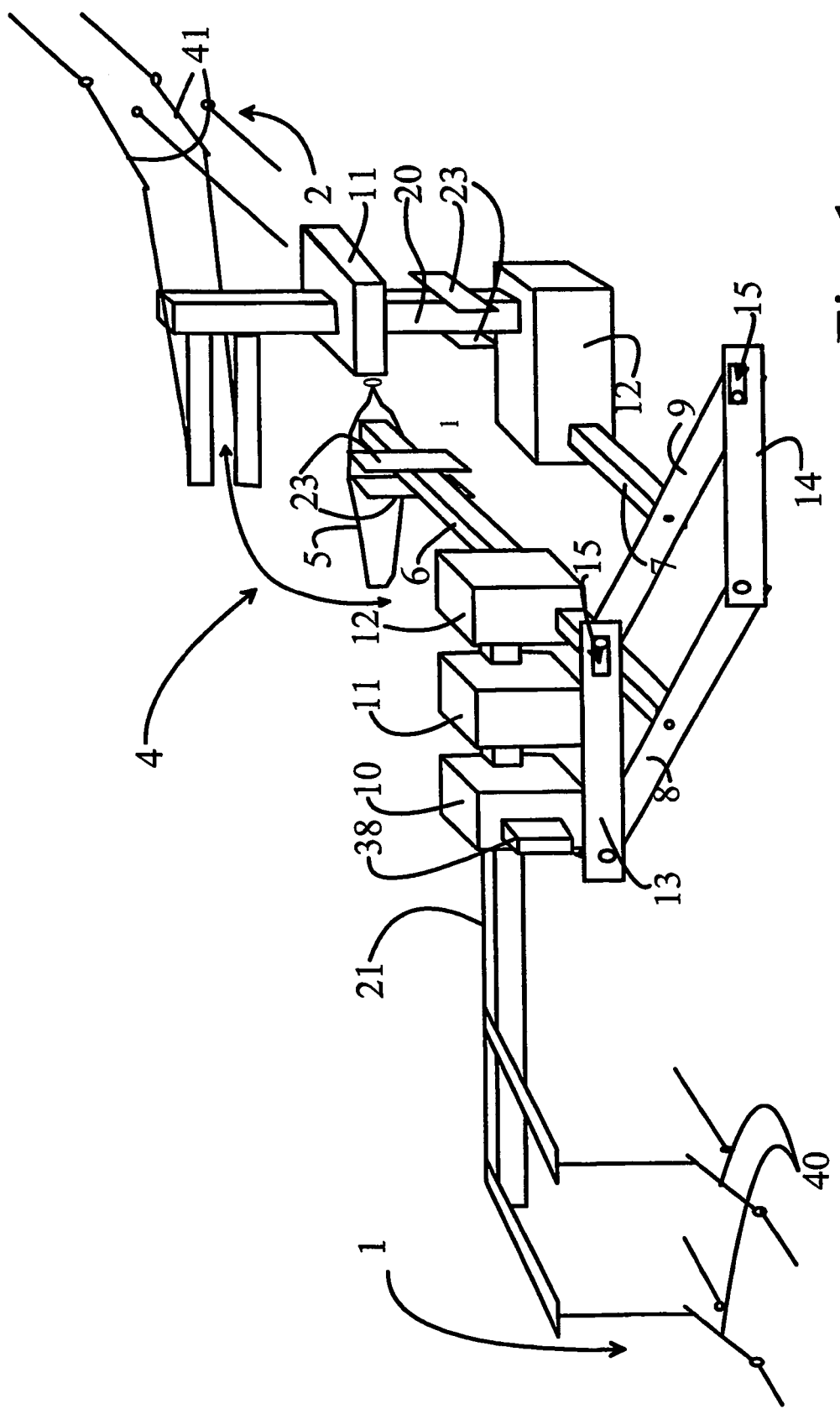
FIG. 1a shows a perspective view of one switching device combination according to the invention, in a 0-switching state.

In this application, the following terminology is used:

1 actual switching component
2 charging switching component
3 capacitive load
4 controller component
5 controller lever
6 first shaft
7 second shaft
8 transverse lever
9 transverse lever
10 mechanical delay elements
11 spring arrangement
12 angle gear
13 transverse bar
14 transverse bar
15 slot
20 charging switch shaft
21 switch shaft
23 rhythm springs
25 eccentric piece
26 spring
27 eccentric pivot point
28 spring pivot point
30 delay lever
31 $1^{st}$ auxiliary lever
32 $2^{nd}$ auxiliary lever
33 $1^{st}$ pivot point
34 $2^{nd}$ pivot point
35 $3^{rd}$ pivot point
36 series resistances
37 fuses
38 relay
40 main contacts
41 charging contacts According to FIG. 1a, the system according to the invention is examined in a situation in which both the main contacts 40 of the actual switch component 1 and the charging contacts 41 of the charging switch component 2 are open. In this situation, the controller lever 5 of the controller component 4 is in the horizontal position and indicates the 0-state. With the aid of the rhythm springs 23, the first shaft 6 is held firmly in the 0-state while the rhythm springs 23 prevent the first shaft 6 from remaining in the positions between the 0-state and the 1-state. At the end of the shaft 6, there is a permanently attached transverse lever 8, which extends transversely on both sides of the longitudinal axis of the shaft 6 and which is mounted in bearings to the transverse bars 13 and 14. The transverse bars 13 and 14 are, in turn, set in sliding bearings in the second transverse lever 9, which is, in turn, permanently attached transversely to the second shaft 7, relative to it in the same manner as the transverse lever 8. The connection of the transverse bars 13 and 14 to the second shaft 7 is implemented with the aid of a slot-like bearing 15.

The slot 15 permits the bearing pins of the transverse lever 9 to slide along the slots 15. In the 0-state of the lever 5, there is a margin, determined by their length, in the slots 15 when the shaft 6 begins to turn to the 1-state. This margin acts to create a mechanical tolerance in the control of the charging contacts 41. In other words, the slot arrangement 15 can be used to take into account the mechanical difference between the actual switch component 1 and the charging switch component 2. Additional shafts are connected to both the first shaft 6 and the second shaft 7 through an angle gear 12. The switch shaft 21 is connected to the first shaft 6 and the charging switch shaft 20 is connected to the second shaft 7. Rhythm springs 23 are also used in the charging switch shaft 20, or alternatively in the second shaft 7, in order to retain its position clearly in either the 0-state or the 1-state. Instead or in addition of the rhythm springs 23, a spring element 11 can be attached to the shaft 20, in order to differentiate clearly the 0-state and the 1-state from each other and thus to control the charging switch component 2 as precisely as possible.

A spring arrangement 11 is also fitted to the switch shaft 21, in order to separate the 0-state and the 1-state from each other. In addition, a mechanical delay element 10, which will be described later in greater detail, which has a delay regulated by a relay 38 in a manner to be described later, is also connected to the shaft 21. The element 10 is intended to delay the final rotation of the switch shaft 21 from the 0-position to the 1-position, in other words, to delay the closing of the contacts 40 of the switch component 1 relative to the closing of the charging contacts 41.

Figure 1B:
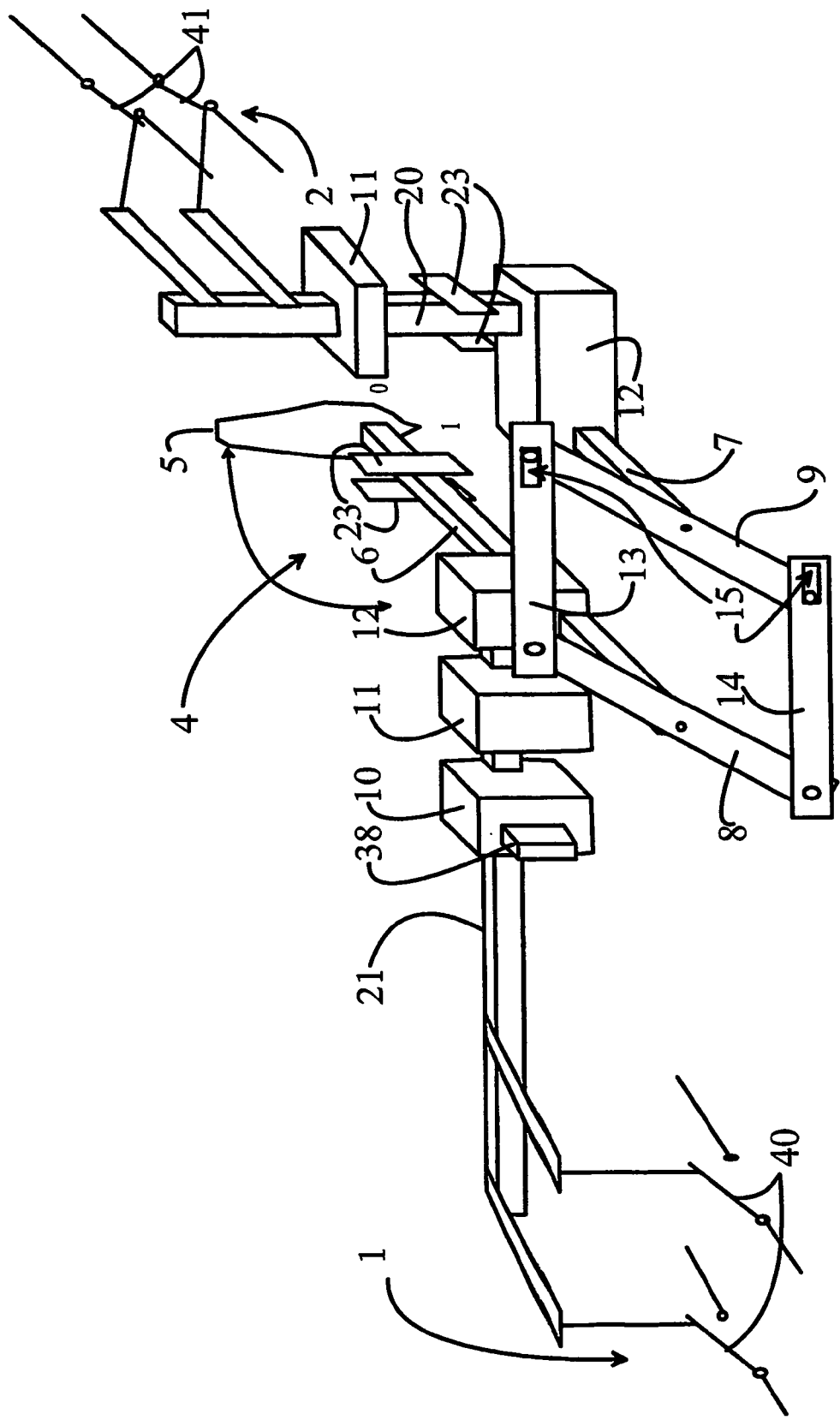
FIG. 1b shows a perspective view of the switching device combination according to FIG. 1a, in a 1-switching state.

FIG. 1*b* shows the intermediate stage, in which the lever 5 is turned to the 1-state, when the transverse bars 13 and 15 have moved the transverse lever 9 to its extreme position due to the influence of the rhythm springs 23 and/or the spring element 11. The pin of the transverse lever 9 is then at the right-hand edge of the slot 15 of the transverse bar 13 while correspondingly the lower guide pin of the transverse lever 9 is at the left-hand edge of the slot 15 of the transverse bar 14.

This position has been preceded by a state, in which the charging switch shaft 20 has not turned to its final position, and thus has not rotated past the dead centre determined by the rhythm springs 23 and/or the spring element 11. In this intermediate position, the pin of the transverse lever 9 is still at the left-hand edge of the slot 15 of the transverse bar 14. After passing the dead centre, the rhythm springs 23 and/or the spring element 11 turn the shaft 20 to its final position, according to FIG. 1*b*.

Figure 2:
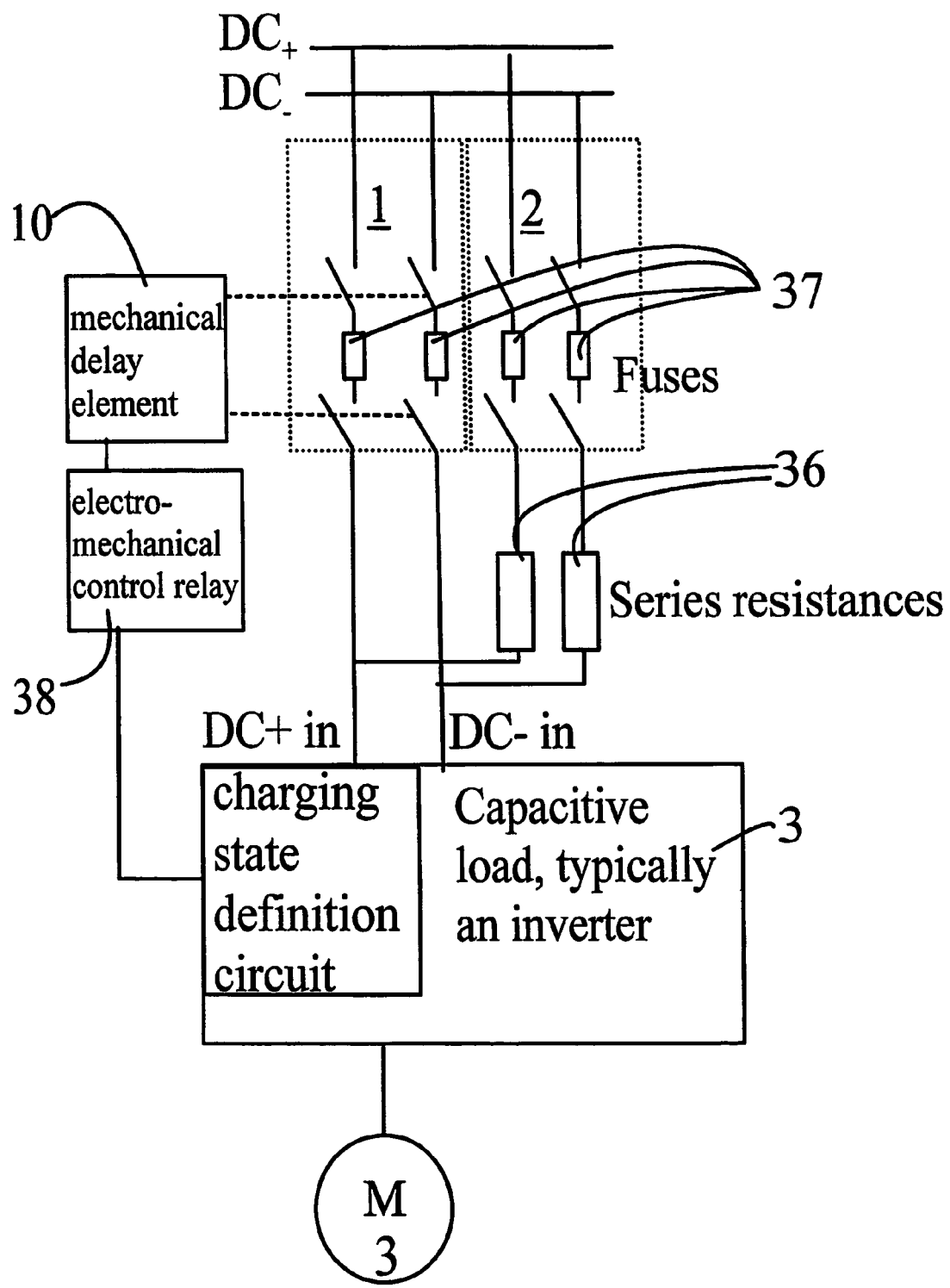
FIG. 2 shows a block diagram of the electrical circuit of the apparatus according to the invention.

According to the figure, the charging contacts 41 are now in the closed state and charge the capacitive load (FIG. 2). Thanks to the mechanical delay element 10, the main contacts of the actual switching component 1 are still open, until a control command arrives at the control relay 38 from the inverter and the shaft 21 rotates, closing the main contacts 40.

When the lever 5 turns back to the position 0, the situation returns to that in FIG. 1*a*.

The block diagram of the system according to FIG. 2 consists of the actual switch component 1 and the charging switch component 2, in which the actual switch component 1 is controlled with the aid of a mechanical delay element 10 under the control of an electromechanical control relay 38. The control relay 38 receives its control signal from the charging state determining/specification circuit, which is typically located in an inverter 3. The inverter 3 in turn controls the motor M, when the charging state of the inverter 3, which is fed through the charging circuit 2, has reached a predefined value. Fuses 37 are arranged between the contacts of both the actual switch component 1 and the charging switch component 2. There are series resistances 36 in the charging circuit, in order to limit the charging current.

FIG. 3 shows in greater detail one spring element 11 that is suitable for the apparatus according to the invention. The element 11 consists of an eccentric piece 25 fitted around either shaft 20 or shaft 21, in which a spring 26 is connected to the pivot point 27. The other end of the spring 26 is, in turn connected to a pivot point 28, which is connected to a fixed frame piece. Thus, in the intermediate state shown by the figure between the 0-state and the 1-state, the spring 26 has stored the maximum amount of energy while when the shaft 20 or 21 turns away from the vertical position shown in FIG. 3, the spring 26 releases the energy, thus assisting the shaft 20 or 21 to move from the 0-state to the 1-state, or vice versa.

FIG. 4 shows one possible way to implement the mechanical delay element 10. The elements operates as follows: the delay lever 30 is connected to the shaft 21 in such a way that, when rotated clockwise, the hole in the delay lever 30 reserved for the shaft 21 permits the shaft 21 to rotate enough that the spring element 11 passes its dead centre and remains in a tensioned state, but the main contacts 40 do not yet close. This can be implemented, for example, by using an octagonal hole in the lever 30. A first auxiliary lever 31, which is in turn jointed to a second auxiliary lever 32 at a second pivot point 34, is attached to the upper end of the lever 30, by means of a first pivot point 33. The second auxiliary lever 32 is, in turn, jointed to a fixed frame point 35.

The auxiliary levers together form a so-called knee joint, which prevents the delay lever 30 from turning clockwise. When the control relay 38 receives a control impulse from the charging state definition circuit show in FIG. 2, the control relay 38 pushes the pivot point 34 over the dead centre from by the auxiliary levers, so that the delay lever 30 is able to turn clockwise and at the same time the shaft 21 rotates due to the force of the spring element 11 and closes the main contacts 40.

Both the spring element 11 and the delay element 10 can naturally be implemented using many different kinds of mechanism, or in an electromechanical manner.

The shafts 6, 7, 20, and 21 preferably have a square cross-section. According to the invention, other rectangular or polygonal or circular or oval cross-sections are also possible. With a circular cross-section, care must naturally be taken to ensure that the attachment to the other elements is mechanically sufficiently reliable, for example, with the aid of roughening, pinching, or protrusions.

The invention claimed is:

1. A switching device combination for capacitive loads (3) connected to a direct voltage, which switching device combination includes
    an actual switch component (1) for connecting the voltage to the capacitive load (3),
    a charging switch component (2) for connecting the voltage to the capacitive load (3) in the initial state of the connection, which charging switch component is dimensioned for a lower current than the actual switch component (1),
    a control component (4), by means of which the switch component (1) is controlled from an open state to a closed state and vice versa, with the aid of a mechanical lever (5), which is connected to a first shaft (6),
    delay elements (10), for delaying the connection of the actual switch component (1), so that the closed charging switch component (2) will have time to charge the capacitive load (3), before the actual switch (1) is connected, and a second shaft (7), which is connected to the first shaft (6), characterized in that the second shaft (7) is connected to the first shaft (6) with the aid of a tolerance (15), in order to control the charging switch component (2).

2. A switching device combination according to claim 1, characterized in that shafts (20, 21), which are at essentially right angles to each other, controlling second contacts (40, 41), are connected to each shaft (6, 7) through an angle gear.

3. A switching device combination according to claim 1 or 2, characterized in that at the end of each shaft (6, 7) are attached, at right angle to the longitudinal axis of the shafts, transverse levers (8, 9), which extend on each side of the ends of the shafts (6, 7) and the ends of the transverse levers (8, 9) are connected by transverse bars (13, 14) equipped with slots (15), in order to synchronize the shafts (6, 7) with each other while allowing a margin.

4. A switching device combination according to any of the above claims 1 or 2, characterized in that the first shaft (6) and the second shaft (7) are essentially parallel to each other.

5. A switching device combination according to any of the above claims 1 or 2, characterized in that the actual switch components (1) are connected to the first shaft (6) with the aid of an angle gear (12) and a switch shaft (21).

6. A switching device combination according to claim 3, characterized in that the transverse bars (13, 14) are connected to the second shaft (6) by a slot arrangement (15, 16), in such a way that the slot arrangement (15, 16) is located at the ends of the transverse bars (13, 14) next to the second shaft (7), in order to adapt the synchronization of the shafts (6, 7) to various mechanical elements, when rotating the first shaft (6) from the open position to the closed position and vice versa.

7. A switching device combination according to any of the above claims 1 or 2, characterized in that the shafts (6, 7) are operationally connected to each other electrically.

8. A switching device combination according to any of the above claims 1 or 2, characterized in that the charging switch components (2) are connected to the second shaft (7) with the aid of an angle gear (12) and the charging switch shaft (20).

* * * * *